United States Patent [19]
Roach

[11] Patent Number: 5,655,733
[45] Date of Patent: Aug. 12, 1997

[54] AIRCRAFT GROUND TRANSPORTER

[76] Inventor: William W. Roach, 5330 Pawnee Rd., Hobbs, N. Mex. 88240

[21] Appl. No.: 428,911

[22] Filed: Apr. 25, 1995

[51] Int. Cl.[6] .................................................. B64C 25/50
[52] U.S. Cl. .......................... 244/50; 414/495; 414/458; 244/17.17
[58] Field of Search ................................ 244/50, 17.17, 244/114 R; 414/495, 458; 180/904, 14.1; 254/10 R, 10 B, 10 C; 280/43.12, 43.23

[56] References Cited

U.S. PATENT DOCUMENTS

| | | |
|---|---|---|
| 1,129,775 | 2/1915 | Anthony . |
| 2,940,769 | 6/1960 | Taylor .................................. 280/43.23 |
| 3,009,711 | 11/1961 | White . |
| 3,346,131 | 10/1967 | Lundell . |
| 3,468,440 | 9/1969 | Poole . |
| 3,688,932 | 9/1972 | Carter .................................. 254/10 R |
| 3,836,027 | 9/1974 | Gardner . |
| 3,995,878 | 12/1976 | Geraci et al. ........................ 244/50 |
| 4,033,422 | 7/1977 | Benning . |
| 4,223,856 | 9/1980 | DiVicenzo . |
| 4,488,612 | 12/1984 | Patterson . |
| 4,516,744 | 5/1985 | Burnside . |
| 4,522,548 | 6/1985 | Oswald . |
| 4,625,944 | 12/1986 | Mankey . |
| 4,820,110 | 4/1989 | Efird . |
| 4,832,560 | 5/1989 | Harp . |
| 4,880,074 | 11/1989 | Matsumoto . |
| 5,056,981 | 10/1991 | Knowles ................................ 414/495 |
| 5,135,346 | 8/1992 | Roach .................................... 414/495 |
| 5,151,004 | 9/1992 | Johnson ................................ 244/50 |

FOREIGN PATENT DOCUMENTS

| | | |
|---|---|---|
| 3723455 | 1/1989 | Germany . |
| 62-85771 | 4/1987 | Japan . |
| 2087838 | 6/1982 | United Kingdom ................ 254/10 R |

Primary Examiner—Andres Kashnikow
Assistant Examiner—Tien Dinh
Attorney, Agent, or Firm—Richard C. Litman

[57] ABSTRACT

An aircraft ground transporter is adapted particularly for the transport of wheelless, skid supported aircraft (e.g., helicopters) on the ground. The transporter is self propelled and includes seating for an operator thereon. The device is hydraulically powered and operated, with an engine providing power for a hydraulic pump, which in turn provides all lifting, steering, and mobility functions. The configuration of the vehicle includes a generally H-shaped frame, with the forward ends of the two arms of the H each including a steerable wheel or wheels thereon. Each arm includes a lifting bar thereon, which may be raised to lift an aircraft by the cross tubes of the landing skids. The opposite, rearward end of the vehicle includes the engine and most of the hydraulic apparatus, and seating and controls for the operator. Thus, the operator is always facing toward an aircraft being handled by the transporter, and may easily observe the transporter and aircraft being transported thereby. A supplementary tow bar is attachable to the forward end of one of the two arms of the frame, which device enables the transporter to be used to move wheeled aircraft also. The supplementary tow bar automatically clamps to a landing gear strut of a wheeled aircraft when the device is lifted to raise the aircraft wheel clear of the surface, thereby enabling the aircraft to be steered and moved using the transporter.

19 Claims, 4 Drawing Sheets

AIRCRAFT GROUND TRANSPORTER

FIELD OF THE INVENTION

The present invention relates generally to self powered vehicles adapted for the movement of aircraft on the ground, and more specifically to a vehicle adapted particularly for the lifting of the skids of a non-wheeled aircraft (e.g., helicopter) clear of the surface and the transport and carriage of such an aircraft while holding it clear of the surface. An adapter is also disclosed which provides for the attachment of the present transporter to a wheeled aircraft, for towing and maneuvering such wheeled aircraft.

BACKGROUND OF THE INVENTION

Both fixed wing (airplanes) and rotary wing (helicopters) aircraft are designed and engineered for optimum efficiency in flight, with ground maneuvering generally being of secondary importance. While such aircraft can be maneuvered on the ground under their own power, they generally cannot maneuver in tight quarters or (in the case of fixed wing aircraft) reverse direction, and self powered movement within a hangar or other structure is out of the question, due to the air blast from propellers and rotor blades, and the extreme hazard of the movement of such blades in tight quarters. In fact, many (if not most) relatively light helicopters are not permanently equipped with wheels at all, in order to save drag and weight, which weight consideration is even more critical in many helicopters than in fixed wing aircraft.

Accordingly, various ground transport devices have been developed for moving aircraft about on the ground, but most comprise a somewhat universal or generic tug type vehicle, with an aircraft tow bar being attached to connect the vehicle to the aircraft. The aircraft is towed on its own wheels, which precludes the use of such a ground vehicle for the transport of a non-wheeled vehicle such as a helicopter. Moreover, limits relating to the turning radius of the aircraft must be considered, as typically fixed wing aircraft are maneuvered by connecting a tow bar to the nose wheel assembly, which assembly can easily be damaged if too tight a turn is attempted.

Accordingly, a need will be seen for an aircraft ground transporter which is capable of moving and maneuvering both wheeled and non-wheeled aircraft, and both fixed wing and rotary wing aircraft, on the surface. The vehicle must be capable of lifting a non-wheeled aircraft sufficiently to clear the surface and then transporting that aircraft as desired, then gently lowering the aircraft to the surface, all without inducing any hazard of damage to the aircraft or persons in the immediate area. The transporter must be capable of being operated easily by a single operator, without need for more than one person at any part of the operation. Finally, the transporter should preferably include an adapter enabling wheeled, fixed wing aircraft to be maneuvered easily thereby, by lifting the steered wheel or wheels of the aircraft to preclude side loads thereon and maneuvering the aircraft as it rolls on its own main wheels.

DESCRIPTION OF THE PRIOR ART

U.S. Pat. No. 1,129,775 issued to Harold G. Anthony on Feb. 23, 1915 describes a Truck of the manually operated hand truck type. The device includes a manually actuated, articulated parallelogram arrangement which is adapted to be positioned beneath an object to be lifted and to be raised manually by an operator manipulating a lever arm. The device does not include any powered motive means, either for transport or for lifting, as provided by the present transporter, and the front wheels are fixed rather than steerable, as in the present invention. Finally, no provision is made for seating the operator thereon, as the device is not self propelled as in the present aircraft transporter.

U.S. Pat. No. 3,009,711 issued to John J. White on Nov. 21, 1961 describes a Helicopter Tow Dolly wherein the two laterally spaced apart longitudinal lifting arms are manually laterally adjustable for different skid spacing of various helicopters. The lifting arms also comprise the chassis of the vehicle, and are hydraulically movable upward and downward. The White dolly includes a plurality of clamps which secure to the skids of the helicopter, whereas the present transporter merely lifts and supports the skids from below. The White device is also a tricycle wheel configuration and makes no provision for the carriage of the operator, as opposed to the present four wheeled transporter which includes operator seating thereon. Considering the less stable nature of a three wheeled vehicle, the need for the White dolly to include positive skid clamping means extends beyond the scope of the present transporter.

U.S. Pat. No. 3,346,131 issued to Vernon J. Lundell on Oct. 10, 1967 describes a Hydraulic Transporter Trailer wherein the rear wheel assemblies are each independently angularly articulated to provide clearance to the rear of the bed therebetween. However, the bed of the device is a continuous structure, with no intermediate space therein as provided by the present transporter chassis. Even if the bed were made sufficiently narrow to pass between the skids of a helicopter or the like, the articulating rear wheels would block passage of the to skids thereover. The vertically displaceable bed is integrally constructed with the chassis, which therefore also must move vertically, unlike the structurally more stable fixed chassis and articulated lifting arms of the present transporter. Also, no seating means is provided for an operator on the Lundell trailer, nor is any self propulsion means provided.

U.S. Pat. No. 3,468,440 issued to Harold G. Poole on Sep. 23, 1969 describes Vehicles comprising various embodiments of a two wheeled, non-powered trailer. Each of the embodiments includes a generally U-shaped frame, with each arm of the U including a wheel. A continuous central platform extends between the two arms of the U frame, and is articulated to move upwardly and downwardly relative to the frame. As the platform is within the frame, the Poole device cannot be used for the transport of a helicopter, as even if it were adapted to be sufficiently narrow to fit between the skids, the central platform would contact the fuselage of the helicopter rather than the skid members. Moreover, another powered vehicle must be provided in order to move, the Poole trailer, and no means is provided for an operator to ride upon the Poole trailer.

U.S. Pat. No. 3,836,027 issued to Clive D. Gardner on Sep. 17, 1974 describes a Truck Wheel Dolly for use in maneuvering and positioning a relatively heavy truck wheel or the like for mounting or dismounting for repair or replacement. The device comprises a generally U-shaped frame, with parallelogram articulating side rails. However, the device is much lighter than the present aircraft transport, is not self propelled, and does not have provision for an operator to ride thereon.

U.S. Pat. No. 4,033,422 issued to Vernon A. Banning on Jul. 5, 1977 describes an Apparatus For Manoeuvring (sic) Aircraft, which lifts and steers only the front of the aircraft. Separate supplemental wheels must be placed beneath the rear portions of the skids of the aircraft; the present transporter provides for lifting the entire aircraft with a single apparatus. The Benning device is relatively light and is electrically powered, either by a self contained storage battery or by an electrical extension cord. No provision is made for an operator to ride thereon, as with the present transporter.

U.S. Pat. No. 4,223,856 issued to Gary A. DiVicenzo on Sep. 23, 1980 describes Helicopter Ground Handling Equipment comprising a hand truck with lifting arms extending laterally therefrom. The ends of the lifting arms are adapted to insert into preexisting wheel attachment fittings on the skids of the helicopter; thus, such fittings must be attached before the. DiVicenzo apparatus can be used to move a helicopter. While the device is powered, the operator remains on foot and controls the device by a handlebar extending from the front thereof; no means is provided for the operator to ride on the device while it is operation.

U.S. Pat. No. 4,488,612 issued to Thomas A. Patterson on Dec. 18, 1984 describes a Lifting Dolly For Helicopters wherein a plurality of laterally disposed, relatively flat fingers are spread outwardly to be forced between the skids of the helicopter and the underlying surface upon which it is resting. The fingers are then lifted hydraulically by means of the attached frame, thereby lifting the helicopter clear of the surface. While the device may be self propelled, no provision is made for an operator to ride thereon, as in the present transporter.

U.S. Pat. No. 4,516,744 issued to Donald L. Burnside on May 14, 1985 describes a Helicopter Dolly having a separate rear axle and front towing apparatus. The rear of the helicopter must be raised to place the rear axle thereunder, and the front of the helicopter then raised to allow the towing apparatus to be placed thereunder. The apparatus is not powered, and must be towed by a powered vehicle. No provision is made for an operator to ride on the apparatus, as in the present transporter.

U.S. Pat. No. 4,522,548 issued to Norman D. Oswald et al. on Jun. 11, 1985 describes an Aerial Weapons Handling Trailer which, as the title indicates, is not self propelled. A parallelogram articulated lifting portion is placed above generally U-shaped frame, but the structure at each end of the lifting portion is higher than the sides, thus precluding insertion beneath the fuselage of a helicopter. The wheels may all be turned so the trailer may move laterally, unlike the present transporter. Moreover, no seating is provided for an operator thereon, the operator controls the lifting apparatus by means of a cable connected remote control box, while the trailer is moved by means of attachment to a powered vehicle.

U.S. Pat. No. 4,625,944 issued to Harry S. Mankey et al. on Dec. 2, 1986 describes a Safety Device For Lifting Apparatus, wherein a counterbalance valve precludes inadvertent pressure release in the hydraulic system. The device is shown applied to a non-powered trailer having an articulated platform thereon. No seating means is apparent to allow an operator to ride thereon.

U.S. Pat. No. 4,820,110 issued to Alex M. Efird on Apr. 11, 1989 describes a Container Transport System wherein a separable rear axle is connected to the front apparatus by longitudinal cables. The cables are drawn taut to sandwich the lower portion of a container between the rear axle and the front mechanism. While the front portion of the device is powered, the operator must stand and walk with the device, rather than being seated thereon.

U.S. Pat. No. 4,832,560 issued to James J. Harp on May 23, 1989 describes Apparatus And Methods For Containerizing And De-Containerizing A Load. The apparatus comprises a plurality of pneumatic bladders, which serve to lift the racks in the device. A left and a right element may be adjustably laterally spaced apart, and ride on air bearings. The apparatus is particularly adapted for positioning loads into and from shipping containers; it is not self propelled, nor is any provision made for an operator to be seated thereon.

U.S. Pat. No. 4,880,074 issued to Rempei Matsumoto on Nov. 14, 1989 describes a Steering System For A Motor Vehicle, in which multiple rack and pinion units are used. Variable steering ratios dependent upon differing operating conditions are provided. While the present transporter includes rack and pinion steering, the use of such steering means is only in combination with the balance of the device and does not include variable ratios.

U.S. Pat. No. 5,135,346 issued to William W. Roach on Aug. 4, 1992 describes a Helicopter Transporter comprising a generally U-shaped frame having a laterally adjustable width. A longitudinal lifting bar may be raised upwardly from each frame arm. The lifting bars are adapted to contact the cross tubes of the landing skids of the helicopter. The device is relatively complex in comparison to the present invention by the same inventor, having castering wheels to allow lateral movement of the arms, and other features not required on the present transporter. The frame of the present transporter is also differently configured, generally having an H shape. In any event, the present transporter provides additional functions over the device of the '346 patent, in that it is further adaptable for use in moving fixed wing aircraft having wheeled landing gear, as well as rotor wing aircraft having landing skids.

Japanese Patent Publication No. 62-85,771 to Sadatomo Kuribayashi and published on Apr. 20, 1987 describes a Towing Tractor having a lifting support bed thereon. The bed is a generally flat, continuous construction, as evidenced by the vacuum apparatus thereon which provides positive contact with the bottom of an aircraft fuselage for transport of the aircraft. A driver's cab and self propulsion is generally described. However, the practicality of the Kuribayashi tractor may not be universal, as (1) the cab must be situated under the aircraft with the rest of the mechanism, rendering it unsuitable for use except with the largest of aircraft, and (2) the installation of various antennae, anticollision lights, inlet and outlet scoops, fairings, etc. on the bottom of the fuselage of most such aircraft, preclude use of a relatively large contact surface on the bottom of such aircraft.

Finally, German Patent Publication No. 3,723,455 to Karl Biburger and published on Jan. 26, 1989 describes a Fork Lift Trolley For Loading Goods (on) Vehicles. The lifting forks are cantilevered from one end, rather than being supported at each end as in the lifting bars of the present transporter. The device is more akin to a manually actuated hand truck than to any automated or powered equipment, and accordingly the operator must stand and walk with the device; no operator seating is provided.

None of the above noted patents, taken either singly or in combination, are seen to disclose the specific arrangement of concepts disclosed by the present invention.

SUMMARY OF THE INVENTION

By the present invention, an improved aircraft ground transporter is disclosed.

Accordingly, one of the objects of the present invention is to provide an improved aircraft ground transporter which is self propelled, and which further includes seating means for an operator to ride thereon during aircraft transport.

Another of the objects of the present invention is to provide an improved aircraft ground transporter which operator seating, drive system, and controls are disposed at the rear of the vehicle, thereby allowing the operator to have an aircraft being transported thereby positioned in front of him/her for easy observation.

Still another of the objects of the present invention is to provide an improved aircraft ground transporter which is adapted for placement between the landing skids of a helicopter or the like, and includes means providing for the lifting of the helicopter by the landing skid cross tubes.

Yet another of the objects of the present invention is to provide an improved aircraft ground transporter which lifting bars may include offsets therein, providing clearance for various components extending from the helicopter.

Still another of the objects of the present invention is to provide an improved aircraft ground transporter which includes lighting means thereon, enabling an operator of the transporter to operate the device and to transport aircraft thereon, in conditions of darkness.

An additional object of the present invention is to provide an improved aircraft ground transporter which incorporates two rearwardly disposed relatively large diameter non-steerable drive wheels, and two separate forwardly disposed steering axles each having two smaller diameter wheels thereon, and adapted for insertion beneath the fuselage of a small aircraft or the like.

A further object of the present invention is to provide an improved aircraft ground transporter which may include supplemental means providing for the attachment of a landing gear strut of a wheeled aircraft thereto, for transporting of such wheeled aircraft.

A final object of the present invention is to provide an improved aircraft ground transporter for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
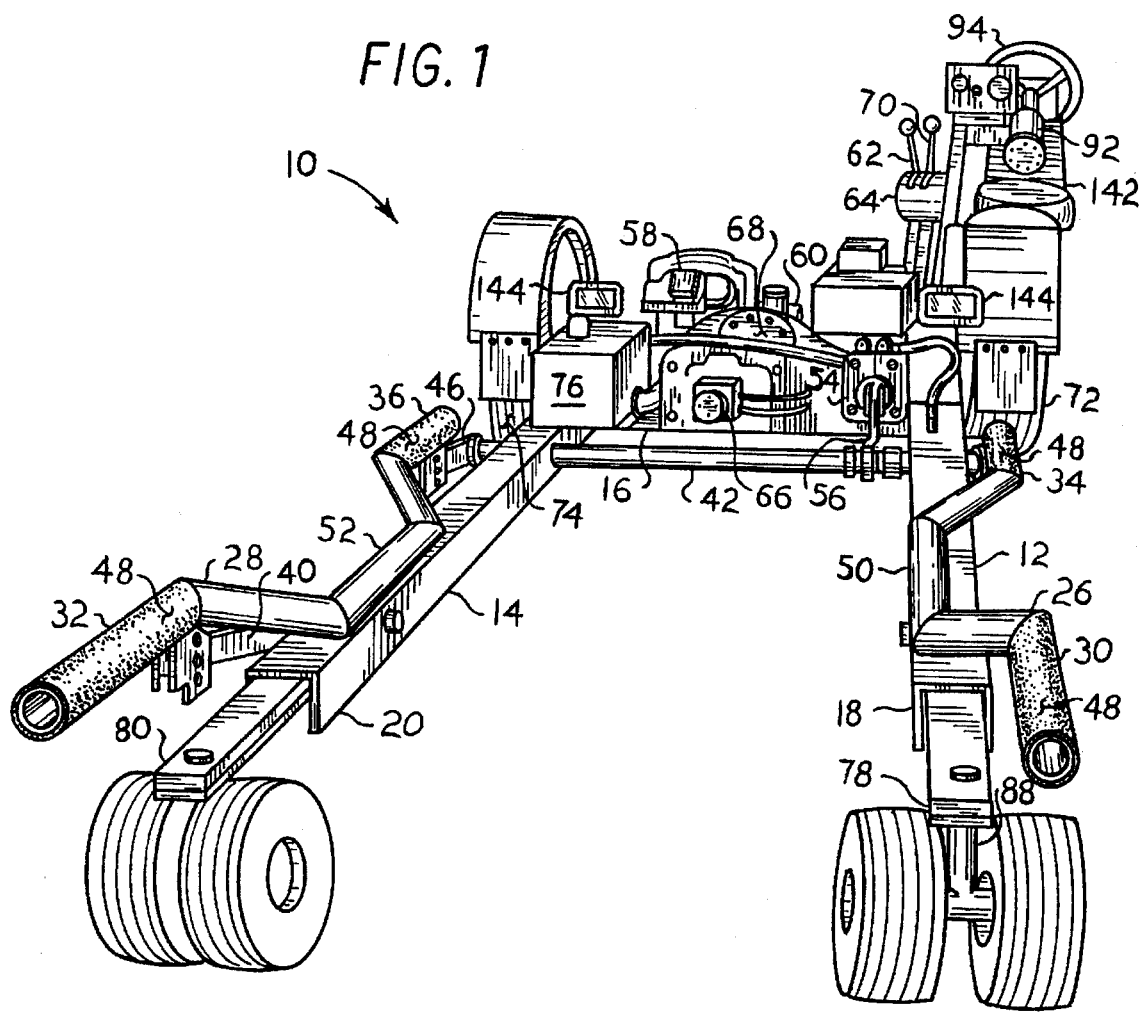
FIG. 1 is a front perspective view of the present aircraft ground transporter, showing its features and general configuration.

Referring now to particularly to FIG. 1 of the drawings, the present invention will be seen to relate to an aircraft ground transporter 10 providing for the lifting and transport of an aircraft equipped with landing skids (e.g., helicopter). The landing skids of such aircraft are universally arranged parallel to the longitudinal axis of the aircraft, and spaced apart to each side by cross tubes connecting the two skids to the aircraft fuselage and to one another.

While it is well known to equip such aircraft with wheels, it is by no means universal, particularly with lighter helicopters. The reduction in weight, and to a certain extent drag, permitted by removal of wheels, provides a significant performance advantage in such aircraft, and the penalty of less convenient ground movement is accepted by many operators of lighter helicopters in return for the performance improvement. Accordingly, the present invention provides a convenient and easy to operate device for moving such skid equipped aircraft (whether equipped with wheels or not) about on the ground. Even if such a landing skid equipped aircraft is also equipped with wheels, use of the present invention for movement may still be desirable, in order to move the aircraft laterally for placement in the corner of a hangar, etc.

Figure 2:
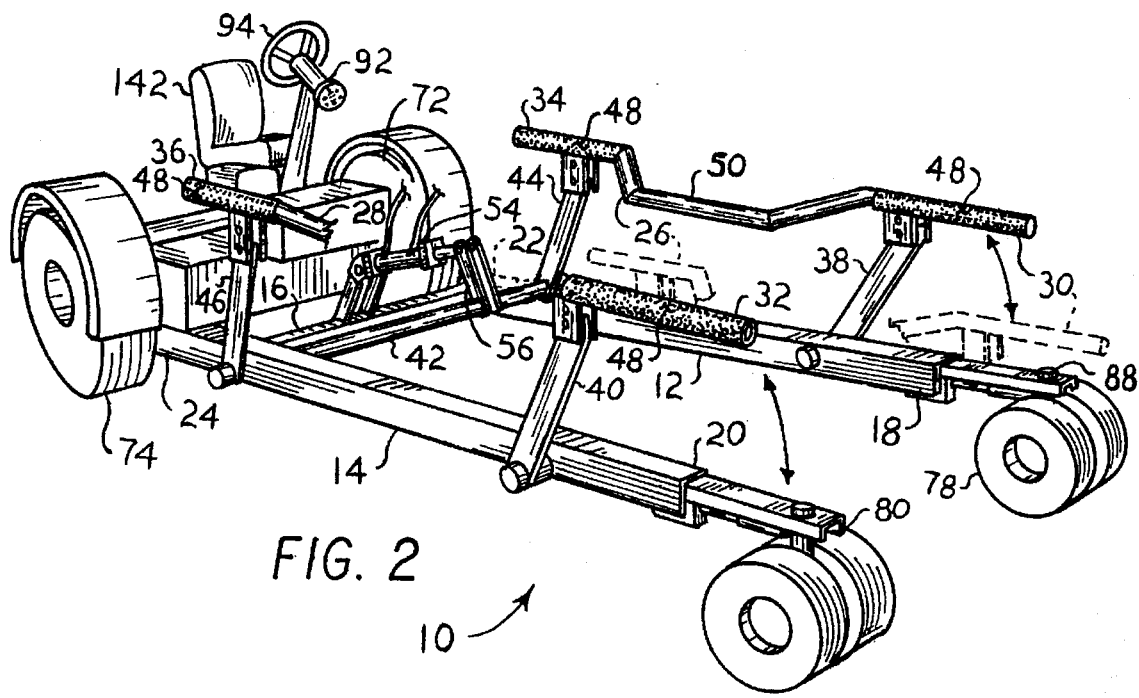
FIG. 2 is a partially broken away right side perspective view of the transporter, showing the operation of the lifting arms.

The present transporter 10 includes a generally H-shaped frame having a left longitudinal arm 12, an opposite right longitudinal arm 14 spaced apart therefrom, and a lateral crossmember 16 permanently and immovably connecting the two arms 12 and 14; the crossmember 16 is more clearly shown in FIG. 2. This configuration provides a fixed, permanent relationship between the two arms 12 and 14. Each of the arms 12 and 14 has a forward end, respectively 18 and 20, and an opposite rearward end, respectively 22 and 24 (shown in FIG. 2). The crossmember 16 is positioned closer to the rear of the transporter than to the front, but is located somewhat forward of the rearward ends 22 and 24 of the left and right arms 12 and 14. Thus, the majority of the length of the transporter 10 is adapted for the aircraft lifting means, while the portion behind the crossmember 16 is used for the various hydraulic and other components and controls used to provide motive and lifting power for the present transporter 10.

Each of the arms 12/14 includes a lifting bar, respectively 26 and 28, articulately attached and generally parallel thereto. Each of the arms 26/28 has a forward end, respectively 30/32, and an opposite rearward end, respectively 34/36. The lifting bar forward ends 30/32 are secured to their respective left and right arms 12/14 at points near their forward ends 18/20 respectively by links 38/40, while their opposite rearward ends 34/36 are secured to a torque tube 42 extending laterally across the frame and forward of the crossmember 16, by another pair of links 44/46; this linkage arrangement is shown more clearly in FIG. 2. Each of the links 38, 40, 44, and 46 are the same length, and the distances between their pivotal attachment points at the forward and rearward ends of the lifting bars 26/28 and arm forward ends 18/20 and the torque tube 42 are equal, to form a parallelogram configuration. Thus, when the bars 26/28 are articulated upward, they remain generally parallel to the arms 12/14 at any given height to which the bars 26 and 28 may be raised.

The bars are particularly adapted for the lifting and support of a landing skid equipped aircraft, such as a helicopter or the like, either wheelless or having wheels on the skids. Such aircraft are nearly universally provided with cross tubes between the skids, and the two lifting bars 26/28 are adapted to contact these cross tubes from below and to lift the aircraft by the cross tubes resting atop the bars 26/28. Accordingly, the bar ends 30, 32, 34, and 36 include padding 48 (e.g., a relatively firm, 60 durometer neoprene sleeve or the like) to protect the cross tubes. Also, the bars 26/28 may have inward and downward offsets 50/52, providing clearance for any aircraft structure (cabin steps, etc. which may extend outwardly and downwardly from the fuselage.

Operation of the above described lifting bars 26/28 is accomplished by rotating the torque tube 42, which in turn causes the two rear lifting bar links 44/46 to which the torque tube 42 is immovably attached, to rotate and raise the ends of the links 44/46 which are pivotally connected to the rear portions 34/36 of the lifting bars 26/28. As the rear portions 34/36 of the lifting bars 26/28 are drawn upward, the front portions 30/32 of the lifting bars 26/28 follow, causing the pivotally attached forward links 38/40 to follow also. This operation is shown in FIG. 2.

Rotation of the torque tube 42 is by means of a single hydraulic strut or cylinder 54, which is pivotally connected to the frame crossmember 16 by a bracket, and also to a lever arm 56 extending radially from the torque tube 42. When the lift bar cylinder 54 is actuated, it draws the lever arm 56 rearward, causing the torque tube 42 to rotate and raise the lift bars 26/28 as described above. Release of pressure allows the bars 26/28 to drop to their lowered position due to gravity; otherwise, reversal of pressure in the double acting lifting cylinder 54 causes the bars 26/28 to lower. Stops (not shown) may be provided to limit movement in either direction.

Hydraulic pressure for the above lifting operation (as well as other operations of the transporter 10) is provided by a power source 58 (e.g., a relatively small internal combustion industrial engine), which provides power to a hydraulic pump 60; these components are shown in the more detailed view of FIG. 1, as opposed to the view of FIG. 2 which has been simplified for clarity in the drawing figure. The pump 60 provides pressure to the cylinder 54 via a lift control valve 62 at the operators console 64; the schematic of FIG. 4 discloses the system.

Figure 4:
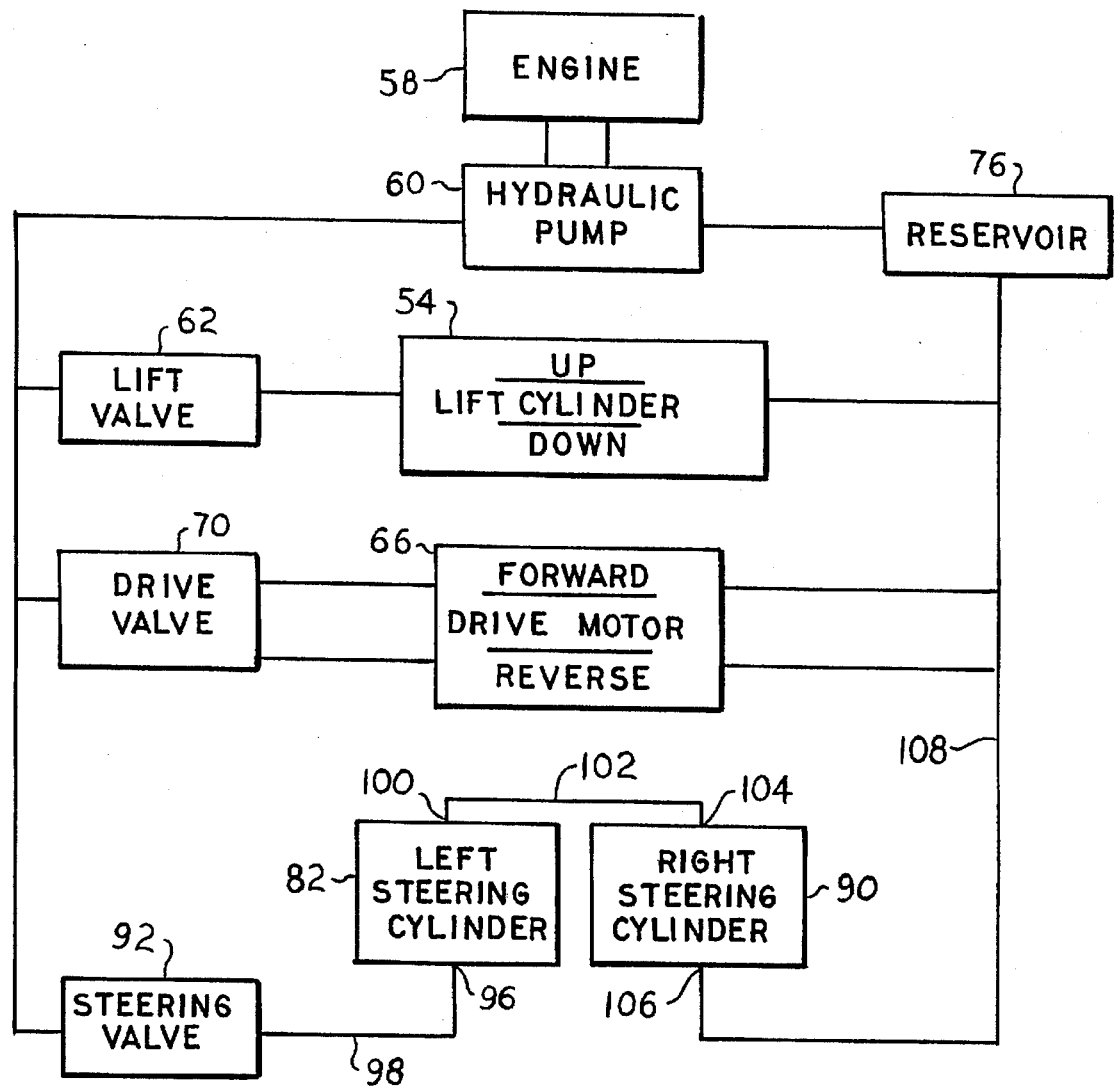
FIG. 4 is a schematic diagram of the hydraulic system of the present aircraft ground transporter.

Motive power for the transporter 10 is also provided by hydraulic means. The above discussed power source 58 and hydraulic pump 60 provide hydraulic power to a hydraulic drive motor 66, which is secured to the front of a conventional straight axle and differential assembly 68. The drive motor 66 is controlled by a drive control valve 70, which is actuated for either forward or reverse motion as desired to reverse the hydraulic flow through the hydraulic drive motor 66. The drive axle and differential 68 uses conventional left and right wheel and tire assemblies 72 and 74 to transfer the power to the underlying surface and to support the rear of the transporter 10. Again, the various hydraulic components and their relationships are shown in the schematic of FIG. 4. A hydraulic fluid reservoir 76 may also be provided as an additional fluid supply, as desired.

Figure 3:
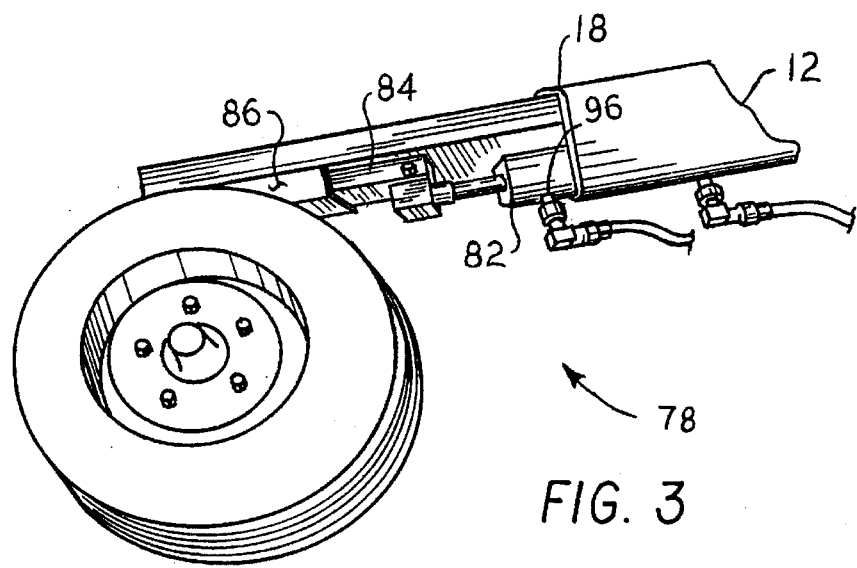
FIG. 3 is a detail perspective view of the steering mechanism of one of the two steerable forward wheels.

The front wheel and tire assemblies 78/80 provide steering for the transporter 10. Each of the arms 12/14 respectively includes a steerable left front wheel assembly 78 and right front wheel assembly 80 extending forwardly from the forward ends 18/20 thereof; FIG. 3 provides a detail view of the left hydraulic steering mechanism of the transporter 10, with the right side being a mirror image. While FIG. 3 discloses only a single wheel and tire, it will be understood that due to the need to keep the front wheel and tire diameters to a minimum in order to provide a relatively low height for the front structure of the transporter 10 so that it may fit easily beneath the low underside of the fuselage and skid cross tubes of an aircraft, preferably dual tires having a diameter considerably smaller than that of the rear drive wheels 72 and 74 are used at the front of the transporter 10. However, other wheel and tire combinations may be used as desired.

The forward end 18 of the left arm 12 includes a left steering cylinder 82 therein, which drives the rack portion 84 of a conventional rack and pinion assembly 86; the pinion gear is concentric with the vertical spindle 88 (FIGS. 1 and 2). A right steering cylinder 90 is provided for the right side, and is shown schematically in FIG. 4. Control of the two steering cylinders 82 and 90 is by means of a steering valve 92, controlled by a conventional steering wheel 94 (FIGS. 1 and 2) from the operators position.

As an example of the operation of the above system, when a left turn is desired, the operator turns the steering wheel conventionally counterclockwise. The steering valve 92 supplies hydraulic pressure to the forward port 96 of the double acting cylinder 82 via a first hydraulic steering line 98, causing the piston to move rearwardly in the cylinder 82. This draws the rack portion 84 rearward, rotating the pinion counterclockwise, thus turning the wheel assembly 78 to the left. (Obviously, the inlet and outlet positions of the hydraulic lines, and the relative left/right positions of the rack and pinion, could be reversed and the same effect would be achieved.)

Due to the rearward movement of the piston in the cylinder 82, hydraulic fluid is forced from the rear portion of the cylinder 82, out the rear port 100, and into the interconnecting hydraulic steering line 102. This line 102 is connected to the rear port 104 of the opposite right side steering cylinder 90, which causes the piston to advance in the cylinder 90, causing the rack (on the opposite side of the pinion from the left wheel assembly 78) to rotate counterclockwise to also turn the right wheel assembly 80 to the left, in concert with the left wheel assembly 78.

From this point, fluid forced from the front port 106 of the right cylinder 90 is returned to the reservoir 76 for recirculation as required, via a return line 108. The above assumes a power steering system, with the hydraulic pressure boosted by the hydraulic pump 60. However, it will be seen that non-powered steering may make use of such a hydraulic system, independently of the hydraulic pump 60, if desired. The steering valve 92 need only be connected directly to the reservoir 76 to draw unpressurized fluid therefrom, if non-powered steering is acceptable.

The above described transporter 10 enables a single operator to move an aircraft equipped with landing gear skids, quickly and easily. The transporter 10 is positioned with the two lifting bars 26/28 beneath the aircraft, and substantially parallel to the longitudinal axis of the aircraft and equally spaced to each side thereof. The operator then raises the lift bars 26/28, using the lift control valve 62, to contact the aircraft skid cross tubes and raise the aircraft skids clear of the underlying surface by a small amount (i.e., a couple of inches or so). The high friction coefficient between the lift bars 26/28 and the aircraft skid cross tubes provided by the lift bar padding 48, substantially reduces any likelihood of the aircraft slipping on the transporter 10. However, by carrying the aircraft so the skids are just clear of the underlying surface, no damage will occur if the aircraft slips. The speed of the transporter 10 is also limited by the relatively small engine 58 and hydraulic drive motor 66, providing further safety; it is intended that the transporter be operated no faster than a brisk walking speed. When the aircraft is positioned as desired, the operator merely lowers the lift bars 26/28 to place the aircraft on the surface, and backs the transporter 10 clear.

Figure 5A:
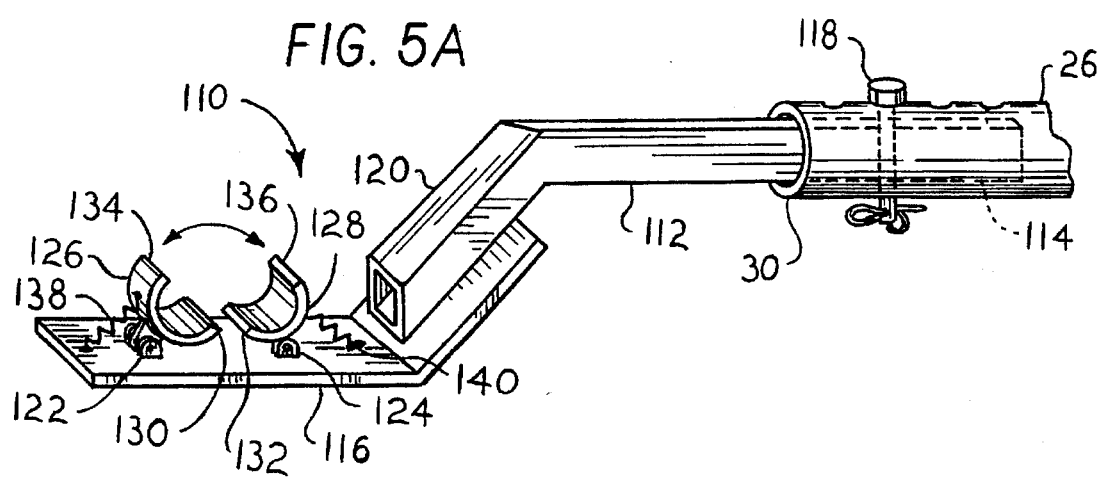
FIG. 5A is a detail perspective view of an additional component of the present transporter, providing for the towing or transport of a wheeled aircraft by connecting to and lifting one landing gear strut thereof.
Figure 5B:
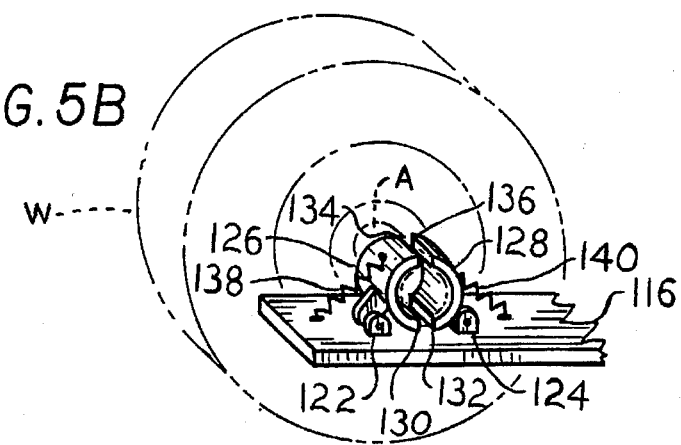
FIG. 5B is a detail perspective view of the automatic actuation of the component of FIG. 5A, as it would appear connected to a wheeled aircraft landing gear strut.

Additional utility is provided in the present transporter 10 by the tow bar accessory 110 of FIGS. 5A and 5B. The tow bar 110 provides towing (pushing/pulling) of a wheeled aircraft, using the transporter 10. Landing wheel equipped aircraft are virtually universally equipped with a left and a right non-steerable main landing gear strut, and a steerable nose wheel or tail wheel strut assembly. Accordingly, various devices have been developed which attach to the steerable nose wheel or tail wheel of such aircraft, for the ground handling thereof. However, oftentimes the nose wheel assembly of such aircraft has a restricted degree of arcuate motion, limiting the turning radius of the aircraft (and the corresponding turning radius of the attached towing device). The present tow bar 110 is not so limited, as it lifts the entire nose wheel assembly (or tail wheel assembly, for such aircraft) clear of the surface during towing operations. Thus, the only consideration required is the steering angle of the aircraft wheel assembly; the assembly itself may be moved laterally across the surface, as it is not in contact therewith. Thus, an aircraft may be maneuvered in a much more confined area with the present transporter and tow bar.

The tow bar 110 comprises an elongate bar 112 or other suitable structure, with a rearward end 114 providing for attachment to the lifting bar forward end 30, and an opposite forward end 116 having an aircraft wheel axle attachment clamp thereon. The rearward end 114 of the bar 112 is preferably sized to fit within the hollow tubular forward end 30 of the lift bar 26, to provide for coaxial attachment. The tow bar 110 is removably attached to the lift bar 26 by means of a transverse bolt or pin 118 passed therethrough, the pin 118 may be withdrawn and the tow bar 110 removed when it is not needed.

It will be noted that the bar 112 includes an intermediate downwardly offset portion 120 therein. This allows the clamp end 116 of the tow bar 110 to be sufficiently low to be inserted beneath the axle A of the aircraft wheel assembly W, as shown in FIG. 5B. The forward portion 116 may comprise a flat plate secured to the bottom of the bar 112, if necessary to lower the clamp as much as possible, or may be an extension of the bar 112.

In any event, the upper surface of the tow bar forward end 116 includes two longitudinally spaced apart pivot points 122 and 124, each of which has a semicylindrical clamp portion, respectively 126 and 128, pivotally attached thereto. The spacing between the pivot points 122/124 is predetermined to cause the two clamp portions 126/128 to close when an object is placed downwardly therein (or the clamps are raised upwardly beneath an object, e.g., axle A) to cause the lower edges 130/132 of the clamps to be pushed downward and the opposite upper clamp edges 134/135 to close together, as shown in FIG. 5B. Normally, the two clamp portions 126/128 are resiliently held open respectively by tension springs 138/140, until urged to a closed position as shown in FIG. 5B.

The present transporter 10 may be used to move and maneuver a wheeled aircraft by temporarily installing the tow bar attachment 110 as described above. The operator of the transporter 10 then maneuvers the transporter 10 as required to position the two clamp portions 126 and 128 beneath the axle A of the steered wheel W (nose wheel or tail wheel) of the aircraft. The lift control valve 62 is then actuated to raise the lift bars 26 and 28, and thus the tow bar attachment 110 and its two clamp portions 126 and 128. The lower edges 130/132 of the clamp portions 126/128 are deflected downwardly by contact with the aircraft axle A, with the opposite upper edges 134/136 closing about the aircraft axle A, as shown in FIG. 5B. The lift bars 26/28 are raised slightly above this point, in order to raise the aircraft wheel W clear of the surface. The transporter 10 may then be driven to maneuver the aircraft as desired, with the lift bars 26/28 merely being lowered to cause the clamp portions 126/128 to release automatically due to the tension springs 138/140 urging the clamp portions 126/128 open when downward pressure is released in the clamp portions, when the aircraft is finally positioned as desired.

Preferably, tow bar attachment 110 is secured to the left side lifting bar 26, so the operating controls (steering wheel 94, lift and movement valves 62 and 70, etc.) and the forwardly facing operators seat 142, which are offset to the left and preferably substantially aligned with the left side lifting bar 26, are substantially aligned with the tow bar 110 coaxially installed in the forward end 30 of the left side lift bar 26. However, it will be noted that the tow bar 110 may be installed in either the left or right lift bars 26/28, as desired. This offset placement of the operators controls and seat provides the operator with more readily observable alignment of the tow bar 110 with the aircraft axle A to facilitate the attachment thereto, and also provides a clearer view for an operator transporting an entire aircraft substantially centered on the lift bars 26/28. In such situation, the operator will have a reasonably good view along the side of the aircraft, rather than being seated directly behind the aircraft and having his/her direct forward view obscured. The laterally offset operators seat 142 and controls also provide clearance from the tail boom or other aircraft structure which may extend over the rear structure of the transporter during transport of the aircraft.

Further utility is provided by the lighting means 144 disposed to each side of the rear of transporter 10, as shown in FIG. 1. It will be noted that the lights 144 are substantially aligned with the left and right arms 12/14, thus providing the greatest lighting power to the sides of an aircraft being carried on the transporter 10 to project past the aircraft, and with the left light being substantially aligned with the line of sight of the operator in the leftwardly offset operators seat 142 for optimum efficiency.

In summary, the above described aircraft transporter 10 provides excellent versatility and ease of movement of various types of aircraft about an aircraft parking ramp, hangar, or the like. A single operator may easily maneuver the present transporter 10 to position it with the lift bars beneath a landing skid equipped aircraft (either wheelless or having supplementary wheels), lift the aircraft clear of the underlying surface by means of a single control valve, and transport the aircraft as required. The present transporter 10 is particularly suitable for use with a wide variety of small to medium size helicopters (e.g., Bell Jet Ranger, or other helicopters having similarly sized and configured landing skids), but may be readily modified by widening or narrowing the spacing between the left and right arms 12 and 14.

Additional versatility is provided by the tow bar attachment 110, providing for the towing of wheeled aircraft as required. The automatic connection of the tow bar to an aircraft wheel axle, provided by merely lifting the tow bar using the lift control lever, enables a single operator to position the transporter, connect the tow bar to the aircraft to raise the clamped wheel axle slightly clear of the underlying surface, and move and reposition the aircraft as required.

It is to be understood that the present invention is not limited to the sole embodiment described above, but encompasses any and all embodiments within the scope of the following claims.

I claim:

1. An aircraft ground transporter providing for the lifting and ground transport of an aircraft having at least left and right landing skids and associated cross tubes, said transporter comprising:

a H-shaped frame including,
a longitudinal left arm having a forward end and an opposite rearward end,
a longitudinal right arm having a forward end and an opposite rearward end, said right arm disposed spaced apart from and parallel to said left arm, and
a crossmember immovably affixed between said left arm and said right arm closer to each said rearward end than to each said forward end of said left arm and said right arm, said cross member maintaining said left arm and said right arm in a fixed relationship;

a left steerable wheel assembly extending from the forward end of said left arm;

a right steerable wheel assembly extending from the forward end of said right arm;

a drive axle extending across said left arm and said right arm immediately rearward of said crossmember and forward of each said rearward end of said left arm and said right arm, with said drive axle including a left end and a right end;

a left drive wheel rotatably affixed to the left end of said drive axle;

a right drive wheel rotatably affixed to the right end of said drive axle, each said drive wheel having a larger diameter than each said steerable wheel assembly;

a left lifting bar articulately secured to said left arm by a parallelogram linkage providing for elevation of said left lifting bar in a vertical plane from said left arm;

a right lifting bar articulately secured to said right arm by a parallelogram linkage providing for elevation of said right lifting bar in a vertical plane from said right arm;

power means providing motive power for said transporter and lifting power for each said lifting bar;

a forwardly facing operators seat located rearwardly of said drive axle; and operating and steering controls disposed in front of said operators seat; whereby an operator positions said transporter beneath the aircraft and between the landing skids thereof, raises each said lifting bar by using said power means so that said left and said right lifting bar each respectively contact and lift the left and right skid cross tubes of the aircraft to lift the aircraft from the underlying surface, and maneuvers said transporter with the aircraft resting thereon as desired to reposition the aircraft.

2. The aircraft transporter of claim 1, wherein:

said power means providing motive power comprises an internal combustion engine driving a hydraulic pump, with said drive axle being powered by a hydraulic motor communicating with said hydraulic pump and said hydraulic motor being controlled by a forward and reverse control valve.

3. The aircraft transporter of claim 1, wherein:

said power means providing lifting power comprises an internal combustion engine driving a hydraulic pump, with each said lifting bar being connected by a torque tube to a single hydraulic strut communicating with said hydraulic pump and said hydraulic strut being controlled by a lifting bar control valve.

4. The aircraft transporter of claim 1, wherein:

a rack and pinion assembly is provided to steer respectively each said left and right steerable wheel assembly, with each rack portion of said assembly being driven by a hydraulic strut.

5. The aircraft transporter of claim 1, wherein:

each said steerable wheel assembly comprises two wheels.

6. The aircraft transporter of claim 1, wherein:

said operators seat and controls are laterally displaced toward said left arm.

7. The aircraft transporter of claim 1, wherein:

each said lifting bar includes a downwardly and inwardly displaced intermediate portion, adapted to provide clearance for aircraft structural components during lifting and transport of the aircraft.

8. The aircraft transporter of claim 1, including:

forwardly facing lighting means installed thereon.

9. The aircraft transporter of claim 1, wherein:

each said lifting bar includes a forward end, and said transporter includes a tow bar removably installable to said forward end of one said lifting bar, with said tow bar adapted for the removable attachment to a landing gear axle of a wheeled aircraft and for towing the wheeled aircraft.

10. The aircraft transporter of claim 9, wherein:

said tow bar includes a rearward lifting bar attachment end and an opposite landing gear axle attachment end having landing gear attachment means thereon, with said landing gear attachment means comprising two spring biased semicircular clamp portions.

11. An aircraft ground transporter providing for the ground transport of a wheeled aircraft having at least three landing gear struts, said transporter comprising:

a frame having at least one longitudinal arm with a forward end and an opposite rearward end;

said at least one arm being immovably affixed to a crossmember disposed closer to said rearward end than to said forward end of said at least one arm;

said forward end of said at least one arm having a steerable wheel assembly extending therefrom;

a drive axle extending across said frame immediately rearward of said crossmember and forward of said rearward end of said at least one arm, with said drive axle including a left end and a right end each respectively having a left drive wheel and a right drive wheel rotatably affixed thereto, with each said drive wheel having a larger diameter than said steerable wheel assembly;

said at least one arm each further having a lifting bar articulately secured thereto and movable in a vertical plane by a parallelogram linkage;

power means providing motive power for said transporter and lifting power for said lifting bar;

a tow bar removably installable to said forward end of said at least one lifting bar, said tow bar having automatic clamp means adapted for the removable attachment to a landing gear axle of a wheeled aircraft, said automatic clamping means including two spring biased semicircular clamp portions pivotally attached to said tow bar, said clamp portions spaced apart such that said clamp portions automatically close about a landing gear axle strut of a wheeled aircraft upon raising said automatic clamp means from below the axle strut to cause the axle strut to rest within and to be lifted by said automatic clamp means for towing the wheeled aircraft, and;

a forwardly facing operators seat and operating and steering controls in front of said operators seat, with said seat being located rearwardly of said drive axle, whereby;

an operator positions said transporter in front of the aircraft with said tow bar being positioned below the aircraft landing gear axle, raises said lifting bar by using said power means so that said clamp means automatically clamp to the landing gear axle and lifts the landing gear strut clear of the underlying surface, and maneuvers said transporter to reposition the aircraft as desired with the aircraft landing gear strut axle captured by said clamp means of said tow bar thereon.

12. The aircraft transporter of claim 11, wherein:

said power means providing motive power comprises an internal combustion engine driving a hydraulic pump, with said drive axle being powered by a hydraulic motor communicating with said hydraulic pump and said hydraulic motor being controlled by a forward and reverse control valve.

13. The aircraft transporter of claim 11, wherein:

said power means providing lifting power comprises an internal combustion engine driving a hydraulic pump, with said at least one lifting bar being connected by a torque tube to a single hydraulic strut communicating with said hydraulic pump and said hydraulic strut being controlled by a lifting bar control valve.

14. The aircraft transporter of claim 11, wherein:

a rack and pinion assembly is provided to steer respectively said steerable wheel assembly, with the rack portion of said assembly being driven by a hydraulic strut.

15. The aircraft transporter of claim 11, wherein:

said steerable wheel assembly comprises two wheels.

16. The aircraft transporter of claim 11, wherein:

said operators seat and controls are laterally displaced toward said at least one arm and are substantially axially aligned with said lifting bar.

17. The aircraft transporter of claim 11, including:

forwardly facing lighting means installed thereon.

18. The aircraft transporter of claim 11, wherein:

said tow bar includes a rearward lifting arm attachment end providing for removable coaxial attachment to said forward end of said at least one lifting arm, and an opposite forward end including said automatic clamp means thereon.

19. The aircraft transporter of claim 11, wherein:

said spring biased clamp portions are biased to an open position by a tension spring connected to each of said clamp portions, thereby automatically causing said clamp portions to be held open automatically when not engaged with an object therein.

* * * * *